(12) United States Patent
Sakuma

(10) Patent No.: US 7,999,882 B2
(45) Date of Patent: Aug. 16, 2011

(54) LIQUID CRYSTAL MODULE

(75) Inventor: Kota Sakuma, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 299 days.

(21) Appl. No.: 12/207,376

(22) Filed: Sep. 9, 2008

(65) Prior Publication Data

US 2009/0079897 A1    Mar. 26, 2009

(30) Foreign Application Priority Data

Sep. 21, 2007 (JP) ................................ 2007-244889

(51) Int. Cl.
*G02F 1/1333* (2006.01)
*G02F 1/1335* (2006.01)

(52) U.S. Cl. ......................................................... 349/58

(58) Field of Classification Search ........................ None
See application file for complete search history.

(56) References Cited

U.S. PATENT DOCUMENTS

2007/0053207 A1* 3/2007 Kokogawa ................... 362/614
2008/0101074 A1   5/2008 Ogura et al.

FOREIGN PATENT DOCUMENTS

| JP | 2006-171167 A | 6/2006 |
| JP | 2006-330162 A | 12/2006 |
| JP | 2007-080736 A | 3/2007 |
| WO | WO-2006/070645 A1 | 7/2006 |

* cited by examiner

*Primary Examiner* — David Nelms
*Assistant Examiner* — Mary A El-Shammaa
(74) *Attorney, Agent, or Firm* — Global IP Counselors

(57) ABSTRACT

A liquid crystal module includes a rear frame, a light reflecting sheet, a cold cathode tube, an optical sheet, a liquid crystal panel, a pair of lead wires and a pair of lamp sockets. The rear frame has an access opening. The cold cathode tube is disposed above the light reflecting sheet in an interior of the rear frame and having a pair of electric terminals at both end portions of the cold cathode tube. The pair of lead wires is connected to the electric terminals to form connected portions. The lead wires extend through the access opening of the rear frame from the interior of the rear frame. The pair of lamp sockets is fixedly attached to the both end portions of the cold cathode tube and fitted into the access opening of the rear frame to support the cold cathode tube with respect to the rear frame.

13 Claims, 7 Drawing Sheets

LIQUID CRYSTAL MODULE

CROSS-REFERENCE TO RELATED APPLICATIONS

This application claims priority to Japanese Patent Application No. 2007-244889 filed on Sep. 21, 2007. The entire disclosure of Japanese Patent Application No. 2007-244889 is hereby incorporated herein by reference.

BACKGROUND OF THE INVENTION

1. Field of the Invention

The present invention generally relates to a liquid crystal module. More specifically, the present invention relates to a liquid crystal module having a light source fixed to a frame.

2. Background Information

A conventional liquid crystal module having a direct backlighting system includes a rear frame, a light reflecting sheet, a plurality of cold cathode tubes, an optical sheet, a liquid crystal panel and a bezel. The light reflecting sheet is provided inside the rear frame. The cold cathode tube is provided over the light reflecting sheet. The cold cathode tube is bent in a U shape. The optical sheet and the liquid crystal panel are disposed above the cold cathode tube. Edges of the liquid crystal panel are held down from above with the bezel.

With the conventional liquid crystal module, each of the cold cathode tubes is fixed in place with a single, large, common lamp socket. The lamp socket is made of silicone rubber. Each of the lamp sockets is attached to both ends of each of the U-shaped cold cathode tubes, and fitted into each of groove-shaped openings formed in the rear frame so as to completely block off the groove-shaped openings. The groove-shaped openings are formed so that lead wires connected to terminals formed at the both ends of the cold cathode tubes extend through the groove-shaped openings.

With another conventional liquid crystal display device, two lead wires are connected to both ends of each of U-shaped lamps used as a back-light of a liquid crystal module. Rubber spacers are attached to the lead wires. The spacers are fitted to the ends of the U-shaped lamps. Then, the spacers are fitted separately to a support frame of the liquid crystal module (see Japanese Laid-Open Patent Application Publication No. 2006-33016, for example).

Also, with another conventional liquid crystal module, lamp sockets cover both ends of horizontal tube parts of U-shaped light sources. The lamp sockets are plugged into pockets formed in a rear frame of the liquid crystal module to fix the light sources (see Japanese Laid-Open Patent Application Publication No. 2006-171167, for example).

With the conventional liquid crystal module, since the single, large lamp sockets made of silicone rubber are expensive, this drives up the cost of the liquid crystal module.

Furthermore, the spacers disclosed in Japanese Laid-Open Patent Application Publication No. 2006-330162 and the lamp sockets disclosed in Japanese Laid-Open Patent Application Publication No. 2006-171167 are fitted into a box-shaped support frame or pockets provided to an outside of a side wall of the rear frame, and are not fitted into groove-shaped openings formed in the rear frame.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal module in which a light source can be accurately positioned and fixed to a rear frame with a simple structure.

In accordance with one aspect of the present invention, a liquid crystal module includes a rear frame, a light reflecting sheet, a cold cathode tube, an optical sheet, a liquid crystal panel, a pair of lead wires and a pair of lamp sockets. The rear frame has an access opening. The light reflecting sheet is disposed in an interior of the rear frame. The cold cathode tube is disposed above the light reflecting sheet in the interior of the rear frame and having a pair of electric terminals at both end portions of the cold cathode tube. The optical sheet and the liquid crystal panel are disposed above the cold cathode tube. The pair of lead wires is connected to the electric terminals to form connected portions between the lead wires and the electric terminals. The lead wires extend through the access opening of the rear frame from the interior of the rear frame. The pair of lamp sockets is fixedly attached to the both end portions of the cold cathode tube and fitted into the access opening of the rear frame to support the cold cathode tube with respect to the rear frame.

With the liquid crystal module of the present invention, it is possible to provide a liquid crystal module in which a light source can be accurately positioned and fixed to a rear frame with a simple structure These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
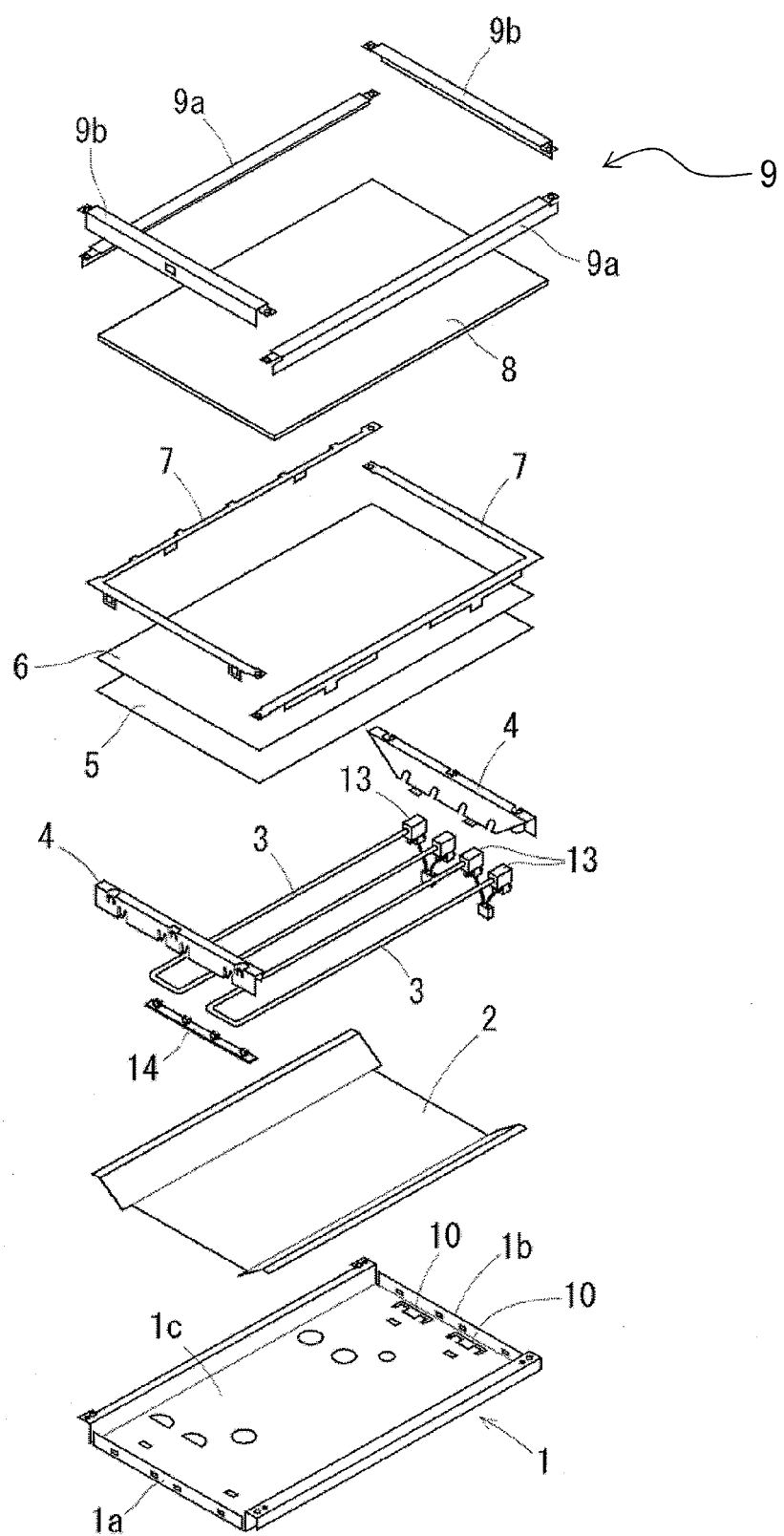
FIG. 1 is exploded perspective view of a liquid crystal module in accordance with an embodiment of the present invention.
Figure 2:
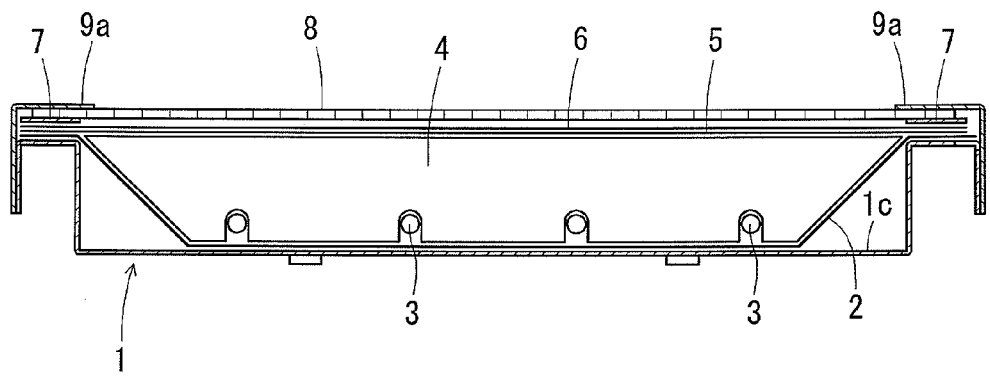
FIG. 2 is a cross sectional view of the liquid crystal module illustrated in FIG. 1.

As shown in FIGS. 1 and 2, a liquid crystal module includes a rear frame 1, a light reflecting sheet 2, a plurality of (two) cold cathode tubes 3, a pair of left and right lamp frames 4, a light diffusing sheet 5, a prism sheet 6, two L-shaped plastic frames 7, a liquid crystal panel (liquid crystal cell) 8 and a bezel 9. The liquid crystal module is installed into a television set or a liquid crystal display device to display image. The rear frame 1 has a left side plate 1a, a right side plate 1b and a bottom plate 1c. The left and right side plates 1a and 1b define an interior of the rear frame 1 therebetween. The light reflecting sheet 2 is bent into an inverted trapezoidal shape. The light reflecting sheet 2 is disposed on the bottom plate 1c within the interior of the rear frame 1. The light reflecting sheet 2 reflects light emitted by the cold cathode tube 3. Each of the cold cathode tubes 3 is bent into a U-shape. The cold cathode tubes 3 are disposed above the light reflecting sheet 2. A pair of lead wires 11 is connected to each of the cold cathode tubes 3. Specifically, each of the lead wires 11 is connected to each of terminals (e.g., electric terminals) 3a formed at both ends (e.g., both end portions) of each of the cold cathode tubes 3 (see FIG. 7) to form a connected portion 20 between the lead wire 11 and the terminal 3a. Furthermore, a connector 12 is connected to each of the pair of the lead wires 11 to supply power to the cold cathode tubes 3 through the lead wires 11. Specifically, the connector 12 is connected to distal ends of the pair of the lead wires 11. The left and right lamp frames 4 are attached on an inside of left and right side plates 1a and 1b of the frame 1. The light diffusing sheet 5 and the prism sheet 6 are disposed one over the other as optical sheets. Peripheral edges of the light diffusing sheet 5 and the prism sheet 6 are held down by the plastic frames 7. The liquid crystal panel 8 is placed over the plastic frames 7. Peripheral edges of the liquid crystal panel 8 are fixed by the bezel 9 from above. The bezel 9 includes two long bezels 9a and two short bezels 9b.

As shown in FIG. 1, the rear frame 1 is made from sheet metal and is in the form of a flat, rectangular box. A pair of groove-shaped openings (e.g., access openings) 10 is formed at a right end portion of the bottom plate 1c of the rear frame 1 along the right side plate 1b. The groove-shaped openings 10 are formed in the same number (two) as the cold cathode tubes 3.

Figure 3:
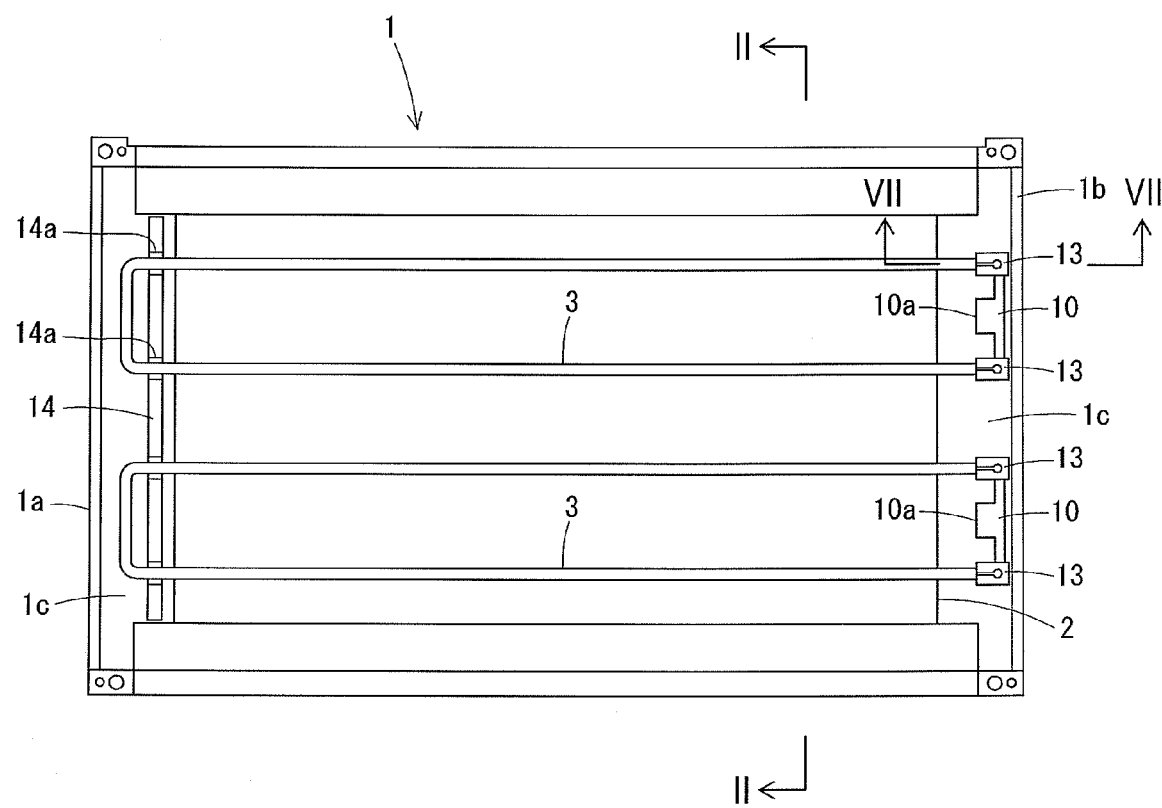
FIG. 3 is a front elevational view of a rear frame of the liquid crystal module illustrated in FIG. 1.
Figure 4:
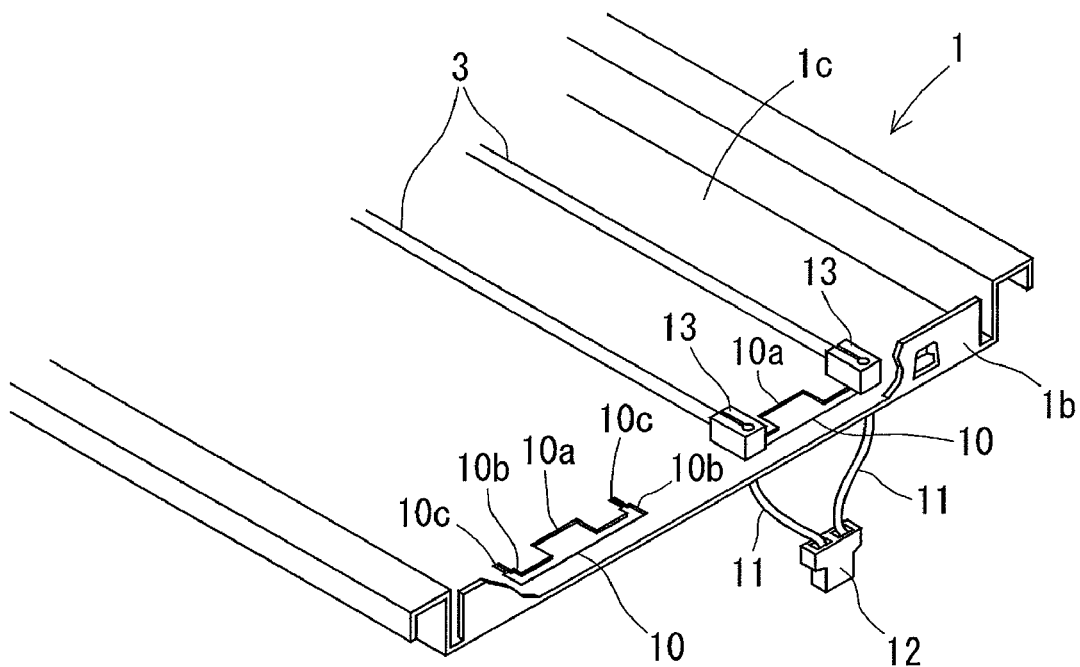
FIG. 4 is a partial perspective view illustrating a front side of the rear frame.

As shown in FIGS. 1, 3 and 4, two pairs of small lamp sockets 13 are attached to the bottom plate 1c of the rear frame 1. Each of the lamp sockets 13 is attached to respective one of both ends of the cold cathode tubes 3 to support the cold cathode tubes 3 with respect to the rear frame 1. Furthermore, a lamp holder 14 is fixedly attached to the bottom plate 1c of the rear frame 1 to support each of the cold cathode tubes 3 at a location near a bent portion of each of the cold cathode tubes 3. The bent portion is located at the opposite side of the both ends of each of the cold cathode tubes 3. Specifically, the lamp holder 14 includes two pairs of two-pronged supports 14a. Each of the pairs of the two-pronged supports 14a supports each of the cold cathode tubes 3. With this structure, the cold cathode tubes 3 are attached and fixed with respect to the rear frame 1 so as not to become misaligned.

Figure 5:
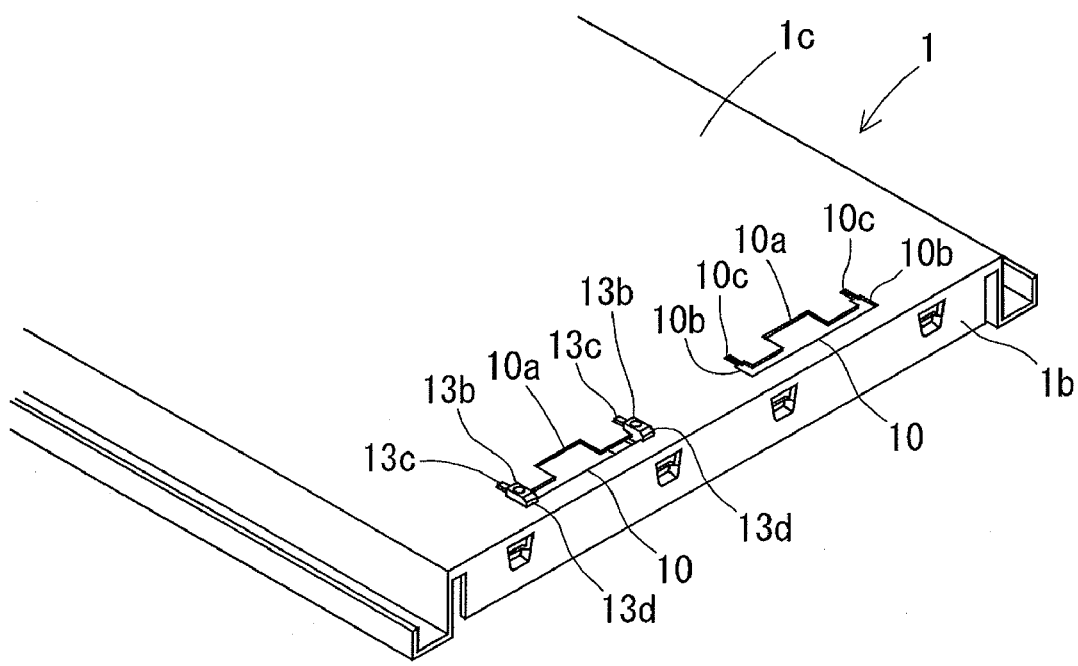
FIG. 5 is a partial perspective view illustrating a rear side of the rear frame.

The groove-shaped openings 10 are formed in the bottom plate 1c so that the lead wires 11 extend through the groove-shaped opening 10 from the interior of the rear frame 1. As shown in FIGS. 4 and 5, each of the groove-shaped openings 10 includes a wide connector insertion opening (e.g., connector insertion portion) 10a, a pair of socket attachment openings 10b and a pair of positioning slits 10c. Each of the groove-shaped openings 10 is formed in a closed hole having a continuous circumference. The wide connector insertion opening 10a is formed in a center portion of each of the groove-shaped openings 10. The connector 12 connected to the lead wires 11 is inserted through the wide connector insertion opening 10a when the lamp sockets 13 are attached to the rear frame 1. The socket attachment openings 10b are formed at both lateral end portions (e.g., both end portions) of each of the groove-shaped openings 10. The lamp sockets 13 are fitted into the socket attachment openings 10b, respectively. The positioning slits 10c serves as positioning-use engaged components. The positioning slits 10c extend from the socket attachment openings 10b, respectively, in a direction perpendicular to lengthwise direction of the groove-shaped openings 10.

The lamp sockets 13 are made of silicone rubber and are elastically deformable. Each of the lamp sockets 13 is integrally formed as a one-piece unitary member. As shown in FIGS. 8 to 13, each of the lamp sockets 13 includes a socket main body 13a, a leg portion 13b and a positioning rib 13c. The socket main body 13a is formed in a cuboid shape. The socket main body 13a includes a circular cavity 13e and a slit portion 13f. The circular cavity 13e is a cylindrical hole formed from a front face of the socket main body 13a to near a rear face of the socket main body 13a. Each ends of the cold cathode tubes 3 is inserted into the circular cavity 13e. The slit portion 13f is formed extending from an upper face of the socket main body 13a to the circular cavity 13e. Specifically, the slit portion 13f extends along the circular cavity 13e. The leg portion 13b is integrally formed with the socket main body 13a so that the leg portion 13b protrudes downward from the socket main body 13a. The leg portion 13b includes a retaining tab 13d. The retaining tab 13d serves as a retaining-use latching component. The retaining tab 13d is integrally formed at a lower end portion of a rear face of the leg portion 13b so that the retaining tab 13d protrudes towards the rear face side of the leg portion 13b. The positioning rib 13c serves as a positioning-use engaging component. The positioning rib 13c protrudes from a lower face of the socket main body 13a. The lamp socket 13 further includes a through-hole 13g formed from the lower face of the leg portion 13b to the upper face of the socket main body 13a. The lead wire 11 is inserted into the through-hole 13g.

Figure 6:
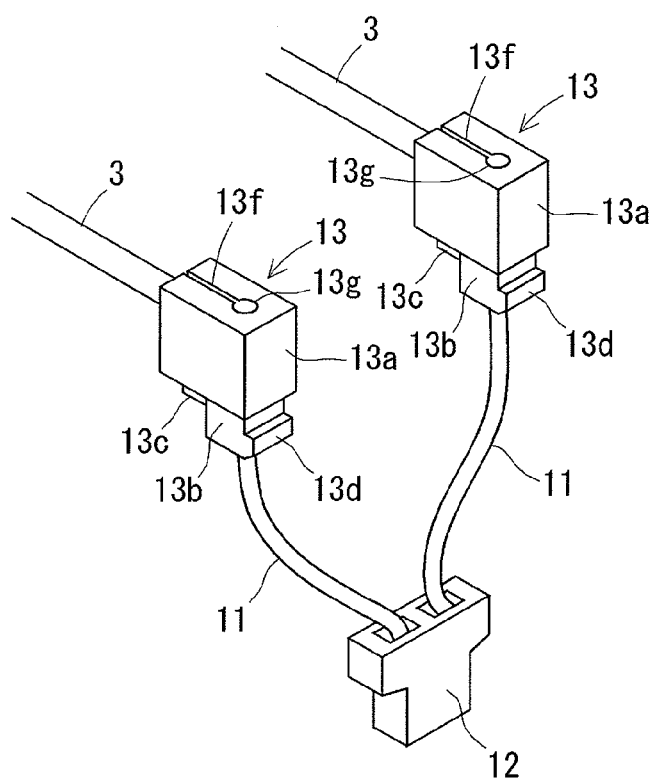
FIG. 6 is a perspective view of a lamp socket.
Figure 7:
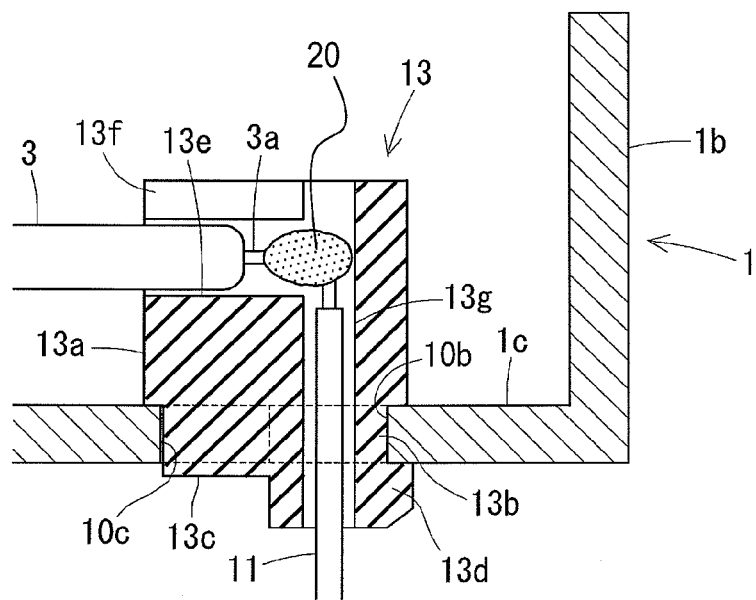
FIG. 7 is a cross sectional view of an attachment between the lamp socket and the rear frame taken along line VII-VII shown in FIG. 3.
Figure 8:
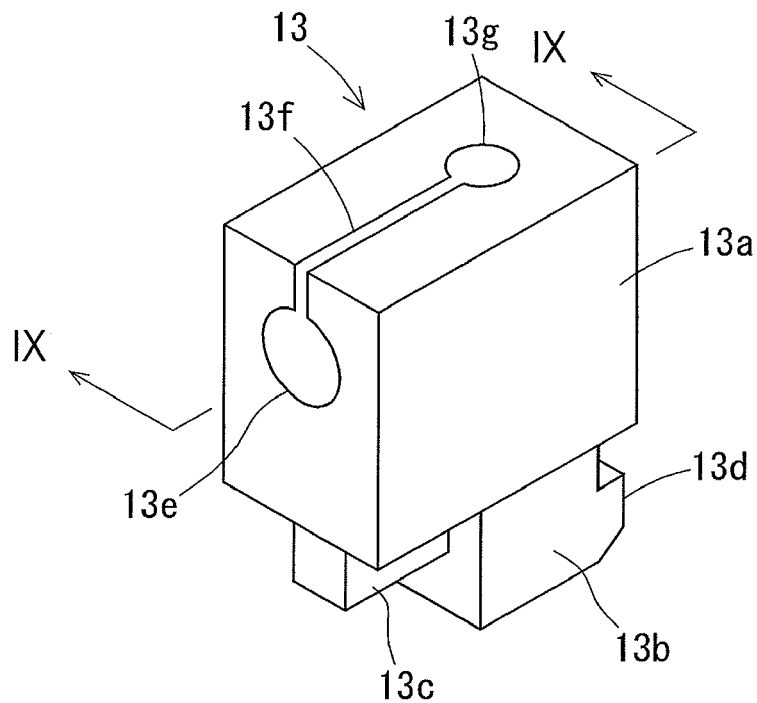
FIG. 8 is a perspective view of the lamp socket.
Figure 9:
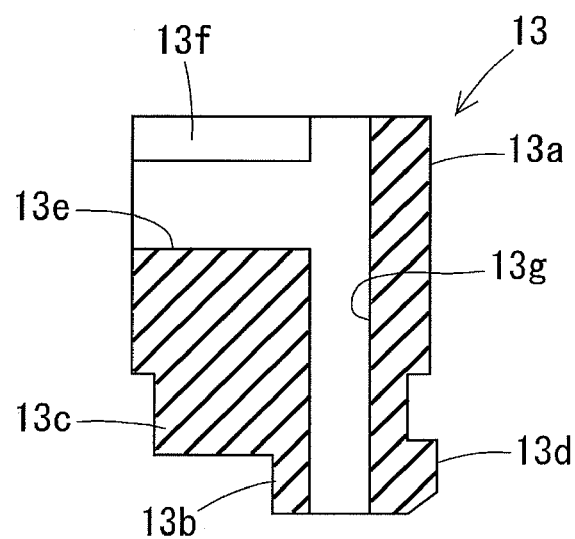
FIG. 9 a cross sectional view of the lamp socket taken along line IX-IX shown in FIG. 8.
Figure 10:
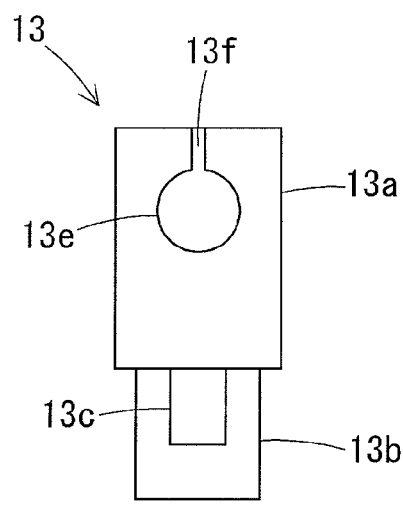
FIG. 10 is a front plan view of the lamp socket illustrated in FIG. 8.
Figure 11:
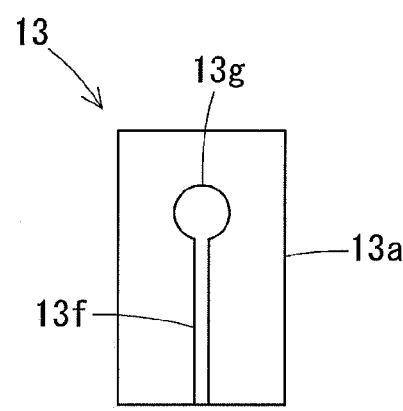
FIG. 11 is a top plan view of the lamp socket illustrated in FIG. 8.
Figure 12:
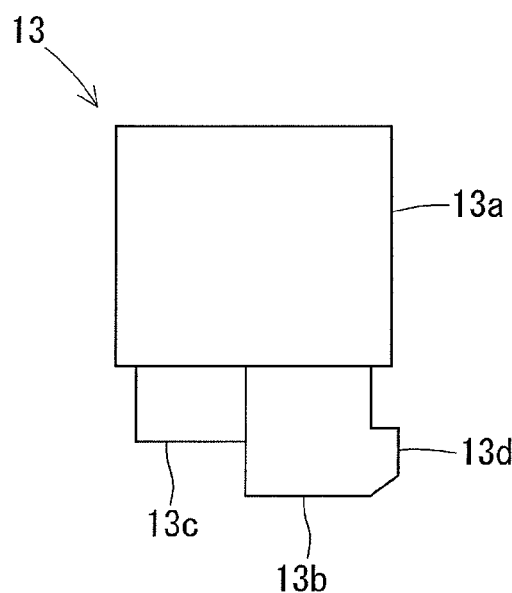
FIG. 12 is a right side plan view of the lamp socket illustrated in FIG. 8.
Figure 13:
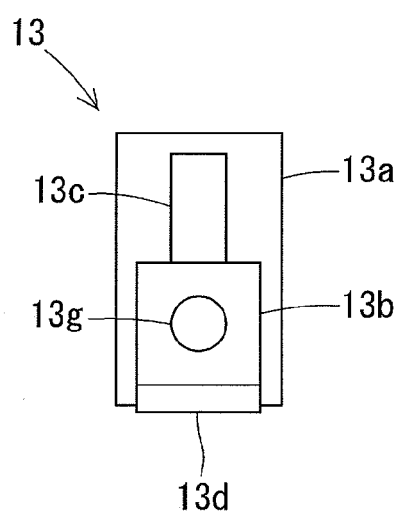
FIG. 13 is a bottom plan view of the lamp socket illustrated in FIG. 8.

As shown in FIGS. 6 and 7, each of the lamp sockets 13 is attached to each of the both ends of the cold cathode tubes 3 so that the connected portions 20 formed between the lead wires 11 and the terminals 3a of the cold cathode tubes 3 are enveloped by the lamp sockets 13. When each of the lamp socket 13 is attached to respective one of the both ends of the cold cathode tubes 3, first the lead wire 11 is inserted through the through-hole 13g so that the lead wire 11 extends through the through-hole 13g and comes out above the upper face of the socket main body 13a. Then, the lead wire 11 is connected to the terminal 3a of the cold cathode tube 3 by soldering, for example, to form the connected portion 20. After that, the cold cathode tube 3 is pushed downward into the slit portion 13f until the cold cathode tube 3 is disposed in the circular cavity 13e.

The both ends of each of the cold cathode tubes 3 are attached and fixed to the rear frame 1 via the lamp sockets 13. As shown in FIGS. 3, 4, 5 and 7, the connector 12 attached at the distal ends of two lead wires 11 is inserted into the connector insertion opening 10a of the groove-shaped opening 10 in the rear frame 1. The lead wires 11 are extend to a rear side of the rear frame 1 from the interior of the rear frame 1 through the groove-shaped opening 10. The leg portions 13b of the lamp sockets 13 are fitted into the socket attachment openings 10b, respectively. At the same time, the positioning ribs 13c are fitted into the positioning slits 10c, respectively. As a result, the lamp sockets 13 are positioned at the both lateral end portions of the groove-shaped opening 10. The retaining tabs 13d of the lamp sockets 13 are also latched from below to opening edge portions of the both lateral end portions of the groove-shaped opening 10. Specifically, the retaining tabs 13d are latched from below to edge portions of the socket attachment openings 10b. As a result, the lamp sockets 13 are prevented from coming loose. Thus, the ends of the cold cathode tubes 3 are securely attached and fixed to the groove-shaped openings 10 of the rear frame 1 via the lamp sockets 13, so that the cold cathode tubes 3 do not become misaligned or fall out.

With the liquid crystal module, the small lamp sockets 13 are individually attached to the both ends of each of the cold cathode tubes 3, rather than attaching the single large common lamp sockets as in the past. This affords considerable savings in the material used for the lamp sockets 13 since the single large common lamp sockets made of silicone rubber are expensive. Thus, the cost of the liquid crystal module can be reduced correspondingly.

With the liquid crystal module, the positioning ribs 13c formed on the lower face of the socket main bodies 13a of the lamp sockets 13 are fitted into the positioning slits 10c formed in the opening edges of the lateral end portions of the groove-shaped openings 10 in the rear frame 1. Thus, the lamp sockets 13 are positioned at the both lateral end portions of the groove-shaped openings 10 in the rear frame 1. Specifically, engagements between the positioning ribs 13c and the positioning slits 10c effectively prevent movement or misalignment of the lamp sockets 13. Furthermore, the positioning ribs 13c and the positioning slits 10c can be easily formed. As a result, the lamp sockets 13 can be securely positioned at the lateral end portions of the groove-shaped openings 10 in the rear frame 1 with a simple structure.

Furthermore, the retaining tabs 13d formed on the leg portions 13b of the lamp sockets 13 are latched from below to the opening edges at the lateral end portions of the groove-shaped openings 10. Thus, the lamp sockets 13 are fixed in the socket attachment openings 10b at the lateral end portions of the groove-shaped openings 10. Specifically, the retaining tabs 13d latched to the edge portions of the socket attachment openings 10b securely prevent the lamp sockets 13 from coming loose from the lateral end portions of the groove-shaped openings 10. Thus, the lamp sockets 13 can be attached and fixed to the lateral end portions of the groove-shaped openings 10. Furthermore, the retaining tabs 13d are easy to form. Thus, there is no need to form any special latched components in the rear frame 1. As a result, latching of the retaining tabs 13d to the opening edges from below allows the lamp sockets 13 to be securely attached and fixed to the lateral end portions of the groove-shaped openings 10 in the rear frame with a simple structure.

Accordingly, the both ends of each of the cold cathode tubes 3 can be securely attached and fixed to the rear frame 1 via the lamp sockets 13, without rattling, becoming misaligned, falling out.

With the liquid crystal module, even though cost is reduced by making the lamp sockets 13 smaller, the cold cathode tubes 3 can be securely attached and fixed without rattling or becoming misaligned. Thus, high performance can be maintained without any risk of the backlight function being lost.

It should go without saying that the lamp sockets 13 can also be used by being attached to straight cold cathode tubes.

Specifically, the lamp sockets 13 can be attached to one ends of two straight cold cathode tubes that is electrically connected at the other ends to each other and bent at a connected portion to form a U-shape cold cathode tube.

The liquid crystal module can be installed into a television set, a personal computer, or another electronic device.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:
1. A liquid crystal module comprising:
a rear frame having a bottom plate with an access opening;
a light reflecting sheet disposed in an interior of the rear frame;
a cold cathode tube disposed above the light reflecting sheet in the interior of the rear frame and having a pair of electric terminals at both end portions of the cold cathode tube;
an optical sheet and a liquid crystal panel disposed above the cold cathode tube;
a pair of lead wires connected to the electric terminals to form connected portions between the lead wires and the electric terminals, the lead wires extending through the access opening of the rear frame from the interior of the rear frame to a rear side of the rear frame relative to the bottom plate of the rear frame; and
a pair of lamp sockets fixedly attached to the both end portions of the cold cathode tube, the lamp sockets being fitted into the access opening of the rear frame and latched to an edge portion of the access opening of the rear frame from the rear side of the rear frame such that the lamp sockets support the cold cathode tube with respect to the rear frame.
2. The liquid crystal module according to claim 1, wherein the access opening of the rear frame includes a closed hole with a continuous circumference.

3. The liquid crystal module according to claim 2, wherein the lamp sockets cover the connected portions between the lead wires and the electric terminals, respectively.

4. The liquid crystal module according to claim 3, wherein the cold cathode tube includes a cold cathode tube formed in U-shape.

5. The liquid crystal module according to claim 3, wherein the cold cathode tube includes a pair of straight cold cathode tubes electrically connected to each other.

6. The liquid crystal module according to claim 1, wherein each of the lamp sockets has an engaging component, and the rear frame has an engaged component, the engaging components of the lamp sockets being engaged with the engaged component of the rear frame to position the lamp sockets at both end portions of the access opening of the rear frame.

7. The liquid crystal module according to claim 6, wherein each of the engaging components includes a positioning rib formed on a lower face of a socket main body of each of the lamp sockets, and
the engaged component includes a pair of positioning slits formed at the both end portions of the access opening of the rear frame, the positioning ribs of the lamp sockets being engaged with the positioning slits of the rear frame to position the lamp sockets at the both end portions of the access opening of the rear frame.

8. The liquid crystal module according to claim 7, wherein the positioning slits extend from the both end portions of the access opening of the rear frame, respectively.

9. The liquid crystal module according to claim 1, wherein each of the lamp sockets has a latching component, and the rear frame has a latched component, the latching components of the lamp sockets being latched with the latched component of the rear frame to retain the lamp sockets at both end portions of the access opening of the rear frame.

10. The liquid crystal module according to claim 9, wherein
each of the latching components includes a retaining tab formed on a leg portion of each of the lamp sockets, and
the latched component includes edge portions formed around the both end portions of the access opening of the rear frame, the retaining tabs of the lamp sockets being latched from the rear side of the rear frame to the edge portions of the rear frame to retain the lamp sockets at the both end portions of the access opening of the rear frame.

11. The liquid crystal module according to claim 10, wherein
the leg portion of each of the lamp sockets is fitted into each of the both end portions of the access opening of the rear frame.

12. The liquid crystal module according to claim 1, wherein
the access opening further has a connector insertion portion through which a connector connected to the pair of lead wires is inserted when the lamp sockets are being attached to the rear frame.

13. The liquid crystal module according to claim 12, wherein
the access opening further has a pair of socket attachment openings formed at both end portions of the access opening and a pair of positioning slits extending from the socket attachment openings, respectively.

* * * * *